United States Patent
Jing et al.

(10) Patent No.: US 11,856,510 B2
(45) Date of Patent: Dec. 26, 2023

(54) REDUCED POWER ROAMING BY AN ACCESSORY DEVICE

(71) Applicant: Apple Inc., Cupertino, CA (US)

(72) Inventors: Xiangpeng Jing, Palo Alto, CA (US); Sivaramachandran Ganesan, San Jose, CA (US); Karthik Anantharaman, Cupertino, CA (US); Lester K. Chan, Cupertino, CA (US); Qi He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 46 days.

(21) Appl. No.: 17/304,291

(22) Filed: Jun. 17, 2021

(65) Prior Publication Data

US 2021/0400575 A1 Dec. 23, 2021

Related U.S. Application Data

(60) Provisional application No. 63/040,907, filed on Jun. 18, 2020.

(51) Int. Cl.
| | |
|---|---|
| *H04W 48/18* | (2009.01) |
| *H04W 48/16* | (2009.01) |
| *H04W 4/02* | (2018.01) |
| *H04W 8/18* | (2009.01) |
| *H04W 8/02* | (2009.01) |
| *H04W 72/56* | (2023.01) |
| *H04W 84/04* | (2009.01) |

(52) U.S. Cl.
CPC ........... *H04W 48/18* (2013.01); *H04W 4/025* (2013.01); *H04W 8/02* (2013.01); *H04W 8/183* (2013.01); *H04W 48/16* (2013.01); *H04W 72/56* (2023.01); *H04W 84/042* (2013.01)

(58) Field of Classification Search
CPC ....... H04W 48/18; H04W 4/025; H04W 8/02; H04W 8/183; H04W 48/16; H04W 72/10; H04W 84/042; H04W 8/18; H04W 52/0209; H04W 60/00; Y02D 30/70
See application file for complete search history.

(56) References Cited

U.S. PATENT DOCUMENTS

| | | | |
|---|---|---|---|
| 2007/0254646 A1* | 11/2007 | Sokondar .............. | H04W 8/183 |
| | | | 455/432.1 |
| 2012/0052911 A1* | 3/2012 | Chin ..................... | H04W 48/18 |
| | | | 455/558 |

(Continued)

*Primary Examiner* — Marcus Hammonds
(74) *Attorney, Agent, or Firm* — Fay Kaplun & Marcin

(57) ABSTRACT

A user equipment (UE) is configured to prioritize a plurality of Public Land Mobile Networks (PLMNs) from an aggregate roaming priority public land mobile network (RP-PLMN) list containing the plurality of PLMNs into a plurality of prioritized PLMNs and connect to a selected PLMN from the plurality of prioritized PLMNs based on a priority of the selected PLMN. The UE is further configured to determine if an application processor (AP) assisted location service is available, wherein the AP-assisted service is configured to identify a plurality of deployed PLMNs and a plurality of frequencies used by the plurality of deployed PLMNs at a current geographical location of the UE and when the AP assisted location service is available, determining if a registered PLMN (RPLMN) is valid in a current mobile country code (MCC).

16 Claims, 4 Drawing Sheets

(56) References Cited

U.S. PATENT DOCUMENTS

| | | | | |
|---|---|---|---|---|
| 2012/0309391 A1* | 12/2012 | Zhang | .................. | H04W 48/16 |
| | | | | 455/435.2 |
| 2013/0109377 A1* | 5/2013 | Al-Khudairi | ......... | H04W 48/16 |
| | | | | 455/432.1 |
| 2015/0065132 A1* | 3/2015 | Ramkumar | ........... | H04W 48/16 |
| | | | | 455/435.2 |
| 2015/0094062 A1* | 4/2015 | Niemi | .................. | H04W 48/16 |
| | | | | 455/435.2 |
| 2015/0119028 A1* | 4/2015 | Zhang | .................. | H04W 48/18 |
| | | | | 455/434 |
| 2019/0159116 A1* | 5/2019 | Guan | .................... | H04W 60/00 |
| 2021/0051516 A1* | 2/2021 | Huang-Fu | ............. | H04W 28/12 |
| 2021/0282080 A1* | 9/2021 | Yang | ....................... | H04W 8/20 |

\* cited by examiner

REDUCED POWER ROAMING BY AN ACCESSORY DEVICE

PRIORITY/INCORPORATION BY REFERENCE

This application claims priority to U.S. Provisional Patent Application Ser. No. 63/040,907 filed on Jun. 18, 2020 and entitled, "Reduced Power Roaming by an Accessory Device," the entirety of which is incorporated by reference herein.

BACKGROUND

A user equipment (UE) may be paired with a further UE (e.g., a smart watch) via a short-range communication protocol. For example, the UE may be a companion device and the further UE may be an accessory device. The companion device and the accessory device may communicate via the short-range communication protocol to perform various operations. In some cases, the further or accessory UE may be capable of cellular communications with a wireless network without the need for the companion UE.

Typically, accessory devices have limited battery capacity. Thus, it is essential that their power is used efficiently and not unnecessarily wasted. For example, autonomous cellular communication (without the help of a companion device) by the accessory device consumes a significant amount of power. Roaming is an exacerbating factor when it comes to power consumption for various reasons. For example, if the accessory device is roaming and is not paired with the companion device, the accessory device will need to scan a plurality of frequencies/bands to find roaming partner networks with which it can connect. Roaming agreements between cellular providers are usually unknown to the accessory device, which raises a challenge when attempting registration on roaming partner networks (e.g., risking getting rejected on multiple roaming networks).

Furthermore, even if a roaming agreement exists with a provider, with respect to network steering of roaming (SoR), it is possible that an accessory device that successfully registered on a roaming partner network may be rejected from registering with that same network at a later time. This may occur, for example, if a target cell is already overloaded with connected UEs. This results in additional registration attempts by the accessory device, thus causing more power consumption.

In addition, a radio resource control (RRC) connection tends to be about 40% longer while roaming due to a slower wireless connection and/or lower RAT (e.g., 2G/3G). Also, a long round trip time (RTT) is experienced since data traffic may be routed to the home network. Still further, the lack of WiFi availability forces a roaming UE (or accessory device) to utilize cellular communications more frequently, again causing increased power consumption.

Furthermore, a roaming UE (or accessory device) typically remains in a limited service mode for a longer period of time due to rejections by roaming partner networks, which results in a recovery scan of frequencies on which the UE can connect, thus further causing additional power consumption. Finally, when there are multiple available roaming partner networks, a roaming UE (or accessory device) may remain connected to a low priority network and will perform periodic scans (e.g., every 6 minutes) for a higher priority network to which it can connect, thus causing additional power consumption.

For these reasons, a UE (e.g., an accessory device) may drain its battery significantly faster than when it is connected to its home network.

SUMMARY

Some exemplary embodiments are related to a processor of a user equipment (UE) configured to perform operations. The operations include prioritizing a plurality of Public Land Mobile Networks (PLMNs) from an aggregate roaming priority public land mobile network (RPPLMN) list containing the plurality of PLMNs into a plurality of prioritized PLMNs and connecting to a selected PLMN from the plurality of prioritized PLMNs based on a priority of the selected PLMN.

Other exemplary embodiments are related to a user equipment (UE) having a transceiver configured to communicate with a plurality of networks and a processor communicatively coupled to the transceiver and configured to perform operations. The operations include prioritizing a plurality of Public Land Mobile Networks (PLMNs) from an aggregate roaming priority public land mobile network (RPPLMN) list containing the plurality of PLMNs into a plurality of prioritized PLMNs and connecting to a selected PLMN from the plurality of prioritized PLMNs based on a priority of the selected PLMN.

DETAILED DESCRIPTION

Figure 1:
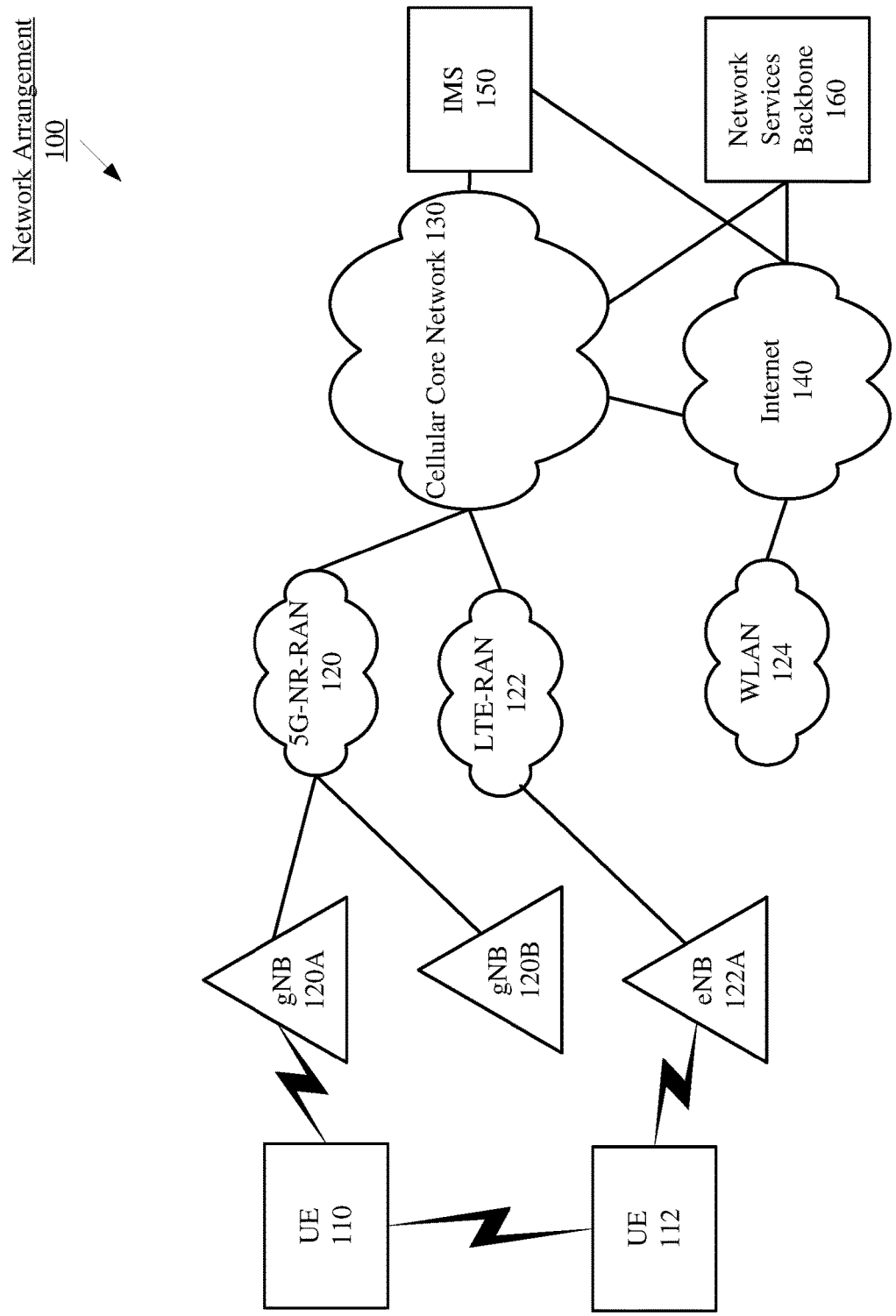
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method to reduce power consumption of an accessory device while roaming.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a specific type of UE, hereinafter referred to as an "accessory device" or "accessory UE." An accessory device is typically a UE that has less capability or limited capabilities with respect to some aspects of the UE, e.g., a limited battery supply. Some examples of accessory UEs may include a smartwatch, an IoT device, etc. As described above, in some instances these accessory devices may be capable of accessing a cellular network via another device referred to herein as a "companion device." However, it should be understood that the accessory device described herein does not require the capability to connect to a cellular network via a companion device, e.g., accessory devices may have a cellular chip and may not have a short range communication chip such as a Bluetooth chip. Moreover, it should also be understood that even though the exemplary embodiments are described with reference to an accessory UE, the exemplary embodiments may be implemented in any type of UE.

The exemplary embodiments are also described with regard to home and roaming networks that include 5G new radio NR radio access technology (RATs) and Long-Term Evolution (LTE) RATs. However, the exemplary embodiments may be applied to UEs connected to or attempting to connect to any type of cellular RAT including legacy RATs such as 3G, 2G, GSM, etc.

As noted above, there are many factors that can quickly drain an accessory device's battery power while roaming. Numerous registration attempts, scanning of all available frequencies, and constantly scanning for higher priority roaming partner networks are just some of the issues that cause unnecessary power consumption. Typically, an accessory device includes an operator-controlled public land mobile network (OPLMN) list stored on a subscriber identity module (SIM) card of the device which the device can refer to when searching for roaming partners. However, this list is not an updated list and the UE is left to search/scan for a roaming partner networks on which it may register.

According to exemplary embodiments, an aggregated roaming priority public land mobile network (PLMN) list may be compiled, stored, and dynamically updated on the accessory device. The aggregated list is based on a plurality of different sources. The accessory device utilizes this list to ensure that the a desirable available network can be selected without wasting registration attempts on less desirable networks (as defined by the list).

Another issue that causes unnecessary power consumption is the number of frequencies scanned by the accessory device. There are typically multiple bands with hundreds of frequencies per band. Normally, a UE and/or accessory device must scan every frequency of every band to find a suitable roaming PLMN.

According to exemplary embodiments, the accessory device may utilize its application processor (AP) to identify a list of all deployed PLMNs at a geographical location of the accessory device and the frequencies used by each of the deployed PLMNs. As a result, the number of frequencies scanned by the accessory device is significantly reduced, thus advantageously saving power. The AP-assisted roaming may be utilized at any time such as, for example, on power up, during a limited or no service period, etc.

FIG. 1 shows an exemplary network arrangement 100 according to various exemplary embodiments. The network arrangement 100 includes UEs 110, 112. Those skilled in the art will understand that the UEs 110, 112 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. An actual network arrangement may include any number of UEs being used by any number of users. Thus, the example of two UEs 110, 112 is only provided for illustrative purposes.

Each of the UEs 110, 112 may be configured to communicate directly with one or more networks. In the example of the network configuration 100, the networks with which the UEs 110, 112 may wirelessly communicate with are a 5G New Radio (NR) radio access network (5G NR-RAN) 120, an LTE radio access network (LTE-RAN) 122 and a wireless local access network (WLAN) 124. However, it should be understood that the UEs 110, 112 may also communicate with other types of networks and the UEs 110, 112 may also communicate with networks over a wired connection. Therefore, the UEs 110, 112 may include a 5G NR chipset to communicate with the 5G NR-RAN 120, an LTE chipset to communicate with the LTE-RAN 122, a universal mobile telecommunications system (UMTS) chipset to communicate with a first legacy network (e.g., 3G network) (not shown), a global system for mobile communications (GSM) chipset to communication with a second legacy network (e.g., 2G network)(not shown), and an ISM chipset to communicate with the WLAN 124.

The UEs 110, 112 may communicate with one another without using the networks 120-124. For example, the UEs 110, 112 may communicate with one another using a short-range communication protocol such as BlueTooth, short range WiFi, etc. Thus, if the UE 110 and the UE 112 are within a proximity of one another (e.g., within a distance in which BlueTooth communications may be performed), the UE 110 and the UE 112 may exchange data. In one exemplary scenario, if the short-range communication protocol is being used, the UE 110 and the UE 112 may have a companion relationship where the UE 110 is a companion device (e.g., mobile phone, tablet computer, smartphone, phablet) and the UE 112 is an accessory device (e.g., a wearable device such as a smartwatch). Thus, in certain operating modes, the UE 112 may be configured to access network services by utilizing only the short-range communication protocol without connecting to any of the networks 120-124. In this exemplary operating mode, the companion UE 110 may connect to one or more of the networks 120-124 and relay data exchanged with the one or more networks 120-124 to the accessory UE 112 over the short-range communication pathway. However, in other operating modes such as, for example, when the Bluetooth connection is severed due to the UE 112 moving out of proximity to the UE 110 or the Bluetooth functionality of the UE 112 being disabled, the UE 112 may independently connect to one or more of the networks 120-124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via the gNB 120A and/or to the LTE RAN 122 via the eNB 122A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UEs 110, 112 may be within range of a plurality of gNBs. Thus, either simultaneously or alternatively, the UEs 110, 112 may also connect to the 5G NR-RAN 120 via the gNB 120B. Reference to two gNBs 120A, 120B is merely for illustrative purposes. The exemplary embodiments may apply to any appropriate number of gNBs. Further, the UEs 110, 112 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UEs 110, 112 to connect to the 5G NR-RAN 120 and/or the LTE RAN 122. For example, as discussed above, the 5G NR-RAN 120 and the LTE RAN 122 may be associated with a particular cellular provider where the UEs 110, 112 and/or the user thereof has a contract and credential information (e.g., stored on a SIM card). Upon detecting the presence of the 5G NR-RAN 120 and/or the LTE RAN 122, the UEs 110, 112 may transmit the corresponding credential information to associate with the 5G NR-RAN 120 and/or the LTE RAN 122. More specifically, the UEs 110, 112 may associate with a specific base station (e.g., the gNB 120A of the 5G NR-RAN 120 or the eNB 122A of the LTE RAN 122).

In addition to the networks 120, 122 and 124 the network arrangement 100 also includes a cellular core network 130, the Internet 140, an IP Multimedia Subsystem (IMS) 150, and a network services backbone 160. The cellular core network 130, e.g., the 5GC for the 5G NR network, may be considered to be the interconnected set of components that manages the operation and traffic of the cellular network. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
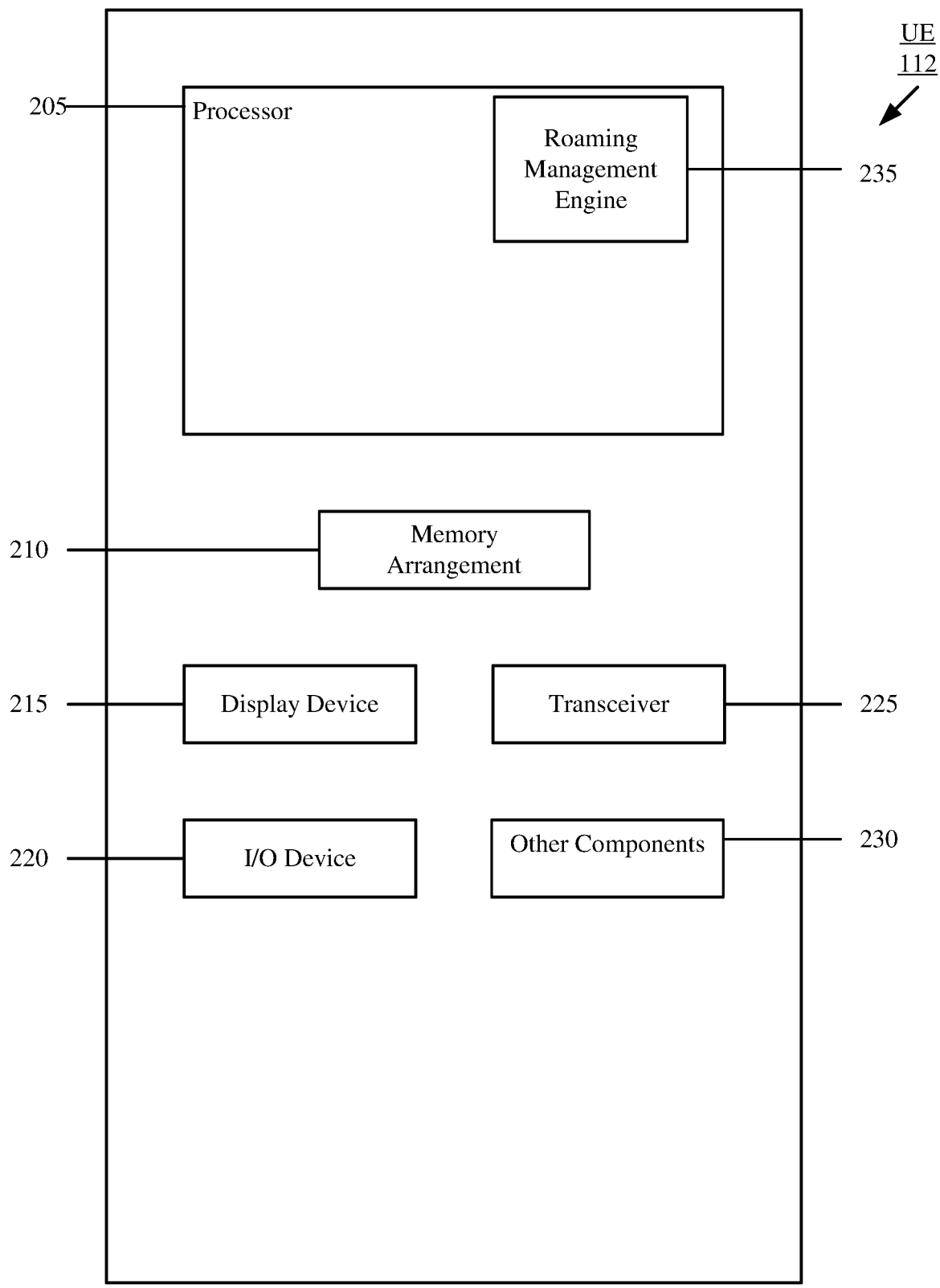
FIG. 2 shows an exemplary UE according to various exemplary embodiments.

FIG. 2 shows an exemplary UE 110 or 112 according to various exemplary embodiments. The following will be described from the perspective of the UE 112 (e.g., an accessory device). However, it should be noted that the following description of the UE 112 may also be applicable to the UE 110. The UE 112 will be described with regard to the network arrangement 100 of FIG. 1. The UE 112 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 112 to other electronic devices, one or more antenna panels, etc.

The processor 205 may be configured to execute a plurality of engines of the UE 112. For example, the engines may include a roaming management engine 235. The roaming management engine 235 may perform various operations related to roaming such as, for example, compile and update an aggregated roaming priority PLMN (RPPLMN) list as well as search for PLMN frequencies on which the UE 112 may register while roaming.

The above referenced engine being an application (e.g., a program) executed by the processor 205 is only exemplary. The functionality associated with the engine may also be represented as a separate incorporated component of the UE 112 or may be a modular component coupled to the UE 112, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband (BB) processor and an applications processor (AP). The exemplary embodiments may be implemented in any of these or other configurations of a UE.

The memory arrangement 210 may be a hardware component configured to store data related to operations performed by the UE 112. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
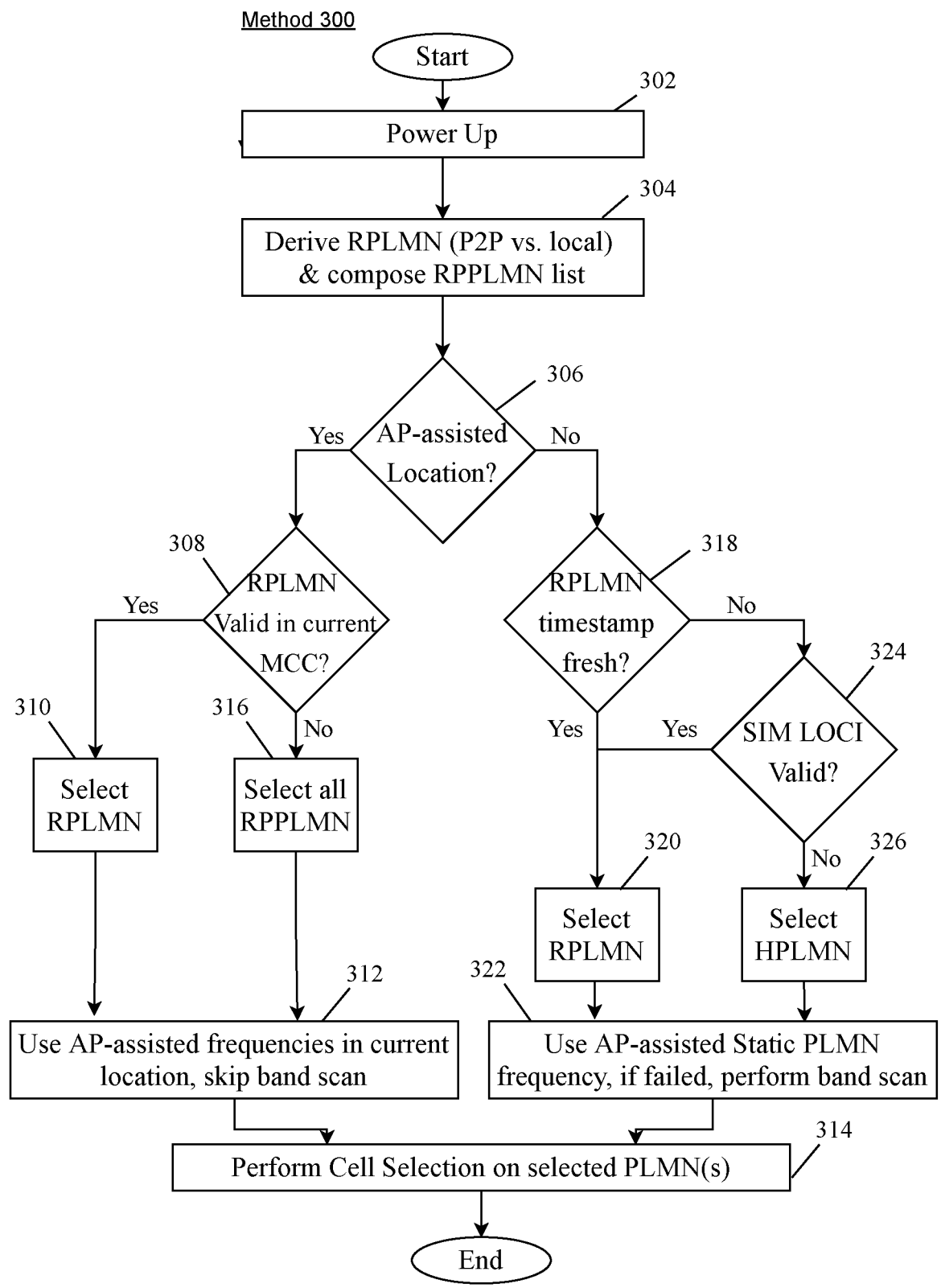
FIG. 3 shows a method of performing cell selection by a UE according to various exemplary embodiments.

FIG. 3 shows a method 300 of performing cell selection by the UE 112 according to various exemplary embodiments. At 302, the UE 112 powers up. It should be noted that powering up does not necessary mean that the UE 112 was completely powered down, but may also cover a scenario in which the transceiver 225 of UE 112, which was previously disabled, is now enabled, e.g., leaving airplane mode, leaving companion mode, etc.

At 304, the UE 112 derives a registered PLMN (RPLMN) either locally from the memory arrangement 210 of the UE 112 or from the companion UE 110 via peer-to-peer (P2P) communications (e.g., via Bluetooth). In addition, the UE 112 composes an aggregated roaming priority PLMN (RPPLMN) list based on a plurality of source priority lists. In some embodiments, the aggregated RPPLMN includes (1) the RPLMN derived locally and/or from the UE 110, (2) an entitlement PLMN list that includes a list of global roaming partners that have a roaming agreement with the cellular provider of the UE 112, (3) an operator-controlled public land mobile network (OPLMN) list stored on a universal SIM card of the UE 112 (or on a SIM card of the companion UE 110 if the OPLMN list on SIM of the UE 112 is empty), and/or (4) a user-based PLMN list.

The RPLMN is a PLMN that was previously used by the UE 112 (or the UE 110) while roaming at the present geographical location. As noted above, the RPLMN may be stored locally on the UE 112 or the UE 110 and shared with the UE 112 via short-range communication (e.g., Bluetooth). The RPLMN list includes the PLMNs to which the UE 112 has previously connected globally. Since the UE 112 is an accessory device, it is more likely that the UE 110 will have the most recent RPLMN because users typically roam with their companion devices more frequently. However, this not always the case since this is entirely dependent on user-preference. If the companion UE 110 has already gone through the roaming network selection process and has chosen a PLMN, the companion UE 110 may share this information with the UE 112 so that the UE 112 can register on the same PLMN, thus saving power. In some embodiments, if, during the roaming network selection process, the companion UE 110 receives a rejection from one or more networks, the companion UE 110 may share this information with the UE 112 so that the UE 112 does not waste power attempting to register on these PLMNs. A priority between the RPLMN stored on the accessory device 112 and the RPLMN stored on the companion device 110 and shared with the accessory device may be based on a timestamp that is associated with the respective RPLMN. The use of various priorities will be described in greater detail below.

An entitlement PLMN list represents roaming partners with which the cellular provider of the UE 112 has a roaming agreement. The entitlement PLMN list may be periodically updated by pushing the updated list to the UE 112 when the UE 112 is connected to a WiFi network. For example, the manufacturer of the UE 112 may maintain the entitlement PLMN on one or more servers within its network through its associations with various carriers. The entitlement PLMN may be stored, for example, on a server that is part of the network services backbone 160. This entitlement PLMN may then be pushed to the UE 112 on a periodic basis when it connects to the WLAN 124 (e.g., any WiFi network).

An OPLMN list is a PLMN list that is configured on the SIM of the UE 112 and/or the SIM of the UE 110 by the cellular provider for the UE. In some embodiments, the SIM of the UE 110 may have more PLMNs configured since it is typically regarded as the primary device that will be used during roaming. In such a case, the UE 110 may share the OPLMNs configured on its SIM with the UE 112.

The user-based PLMN list may be derived from other UEs (e.g., crowd-sourcing) having the same cellular provider. The user-based PLMN list includes PLMNs on which other UEs having various cellular providers have connected globally. The UE 112 may narrow the user-based PLMN list using its cellular provider and current geographical location.

In some embodiments, the UE 112 assigns a priority to the plurality of PLMN lists discussed above. In some embodiments, the UE 112 gives first priority to the newest RPLMN (locally or P2P) from the aggregated RPPLMN list, second priority to PLMNS on the entitlement PLMN list, third priority to PLMNS on the OPLMN list, and fourth priority to PLMNS on the user-based PLMN list.

The aggregated RPPLMN list is stored on the UE 112 and filtered using the detected mobile country code (MCC) of the country in which the UE 112 is located. In some embodiments, if the UE 112 is near a country's border, the UE 112 may also include the PLMNs of the neighboring country while filtering the list. The UE 112 may utilize the aggregated PLMN list when deciding which PLMNs to scan for first, thus saving power by possibly avoiding scanning of lower priority PLMNs altogether. The aggregate RPPLMN further allows the UE 112 to select the highest priority PLMN if multiple PLMNs are available at a given time and location. In some embodiments, unknown PLMNs not on the aggregated RPPLMN list may be treated as forbidden PLMNs by the UE 112.

Returning to FIG. 3, once the aggregate RPPLMN has been composed, the UE 112, at 306, determines whether AP-assisted location is available. AP-assisted location refers to the identification by the AP (e.g., the processor 205) of the UE 112 of one or more PLMNs that are deployed at the current location of the UE 112 and the frequencies being used by those PLMNs. The AP utilizes the geographical location of the UE 112 to provide the UE with this information. The location of the UE 112 may be determined based on any known location services, e.g., GPS-location services, WiFi location services, etc. It should be understood that while the exemplary embodiments describe that the AP is responsible for determining and storing location related information, other components of the UE 112 may also perform the functionalities described herein for the AP.

If, at 306, the AP-assisted location is available because the location of the UE 112 was successfully determined, then, at 308, the UE 112 determines whether an RPLMN is valid for the currently detected MCC. If one or more RPLMNs are valid in the current MCC, then, at 310, that RPLMN(s) is selected. At 312, the UE 112 scans the frequencies identified by the AP as being used by the RPLMN(s). At 314, the UE 112 performs cell selection on the selected RPLMN(s) using the frequency from 312.

If, however, at 308, the UE 112 determines that no RPLMN is valid in the current MCC, then, at 316, the UE 112 utilizes the aggregate RPPLMN list. In this scenario, at 312, the UE 112 scans the frequencies identified by the AP for the PLMNs deployed at the current location of the UE 112. The UE 112 prioritizes the frequency scan as per the aggregate RPPLMN priority discussed above (e.g., scan entitlement PLMN frequencies first, then OPLMN frequencies second, etc.) At 314, the UE 112 performs cell selection on the selected PLMN using the frequency from 312.

If, at 306, the AP-assisted location is not available because the location of the UE 112 could not be determined, then, at 318, the UE 112 determines if a timestamp of an RPLMN is within a predetermined period of time. For example, if the UE 112 was already connected to a PLMN (thus making it an RPLMN) and is subsequently power off and on, the RPLMN timestamp is relatively recent. If RPLMN timestamp is within the predetermined period of time, then, at 210, that RPLMN is selected. Once the RPLMN is identified, the AP of the UE 112 may provide the UE with the frequencies utilized by that PLMN. At 322, the UE 112 uses the AP-provided frequency to connect to the RPLMN. However, if the connection fails (e.g., the registration attempt by the UE 112 on the PLMN is rejected), then the UE 112 may perform a band scan limited to the RPLMN to determine the correct frequency(ies). At 314, the UE 112 performs cell selection on the selected PLMN using the frequency from 322.

If, however, at 318, it is determined that the RPLMN timestamp is not within the predetermined period of time (or if this is the first time the UE 112 is at the current location), the UE 112 determines, at 324, whether or not there one or more OPLMNs on the SIM card on which the UE 112 may register (whether the OPLMNs are valid in the current location). If one or more OPLMNs are identified, then at 320, the UE 112 selects a PLMN based on the PLMN priority defined above. Once a PLMN is selected, the method 300 proceeds to 322 and 314 as described above. If no OPLMNs are identified on the SIM card, the UE 112 selects its home PLMN (HPLMN) at 326. However, because the UE 112 is not home and is roaming, it will detect an MCC change. As a result, the UE 112 will detect the available PLMNs at this location and will select a PLMN based on the PLMN priority defined above. Once a PLMN is selected, the method 300 proceeds to 322 and 314 as described above.

Figure 4:
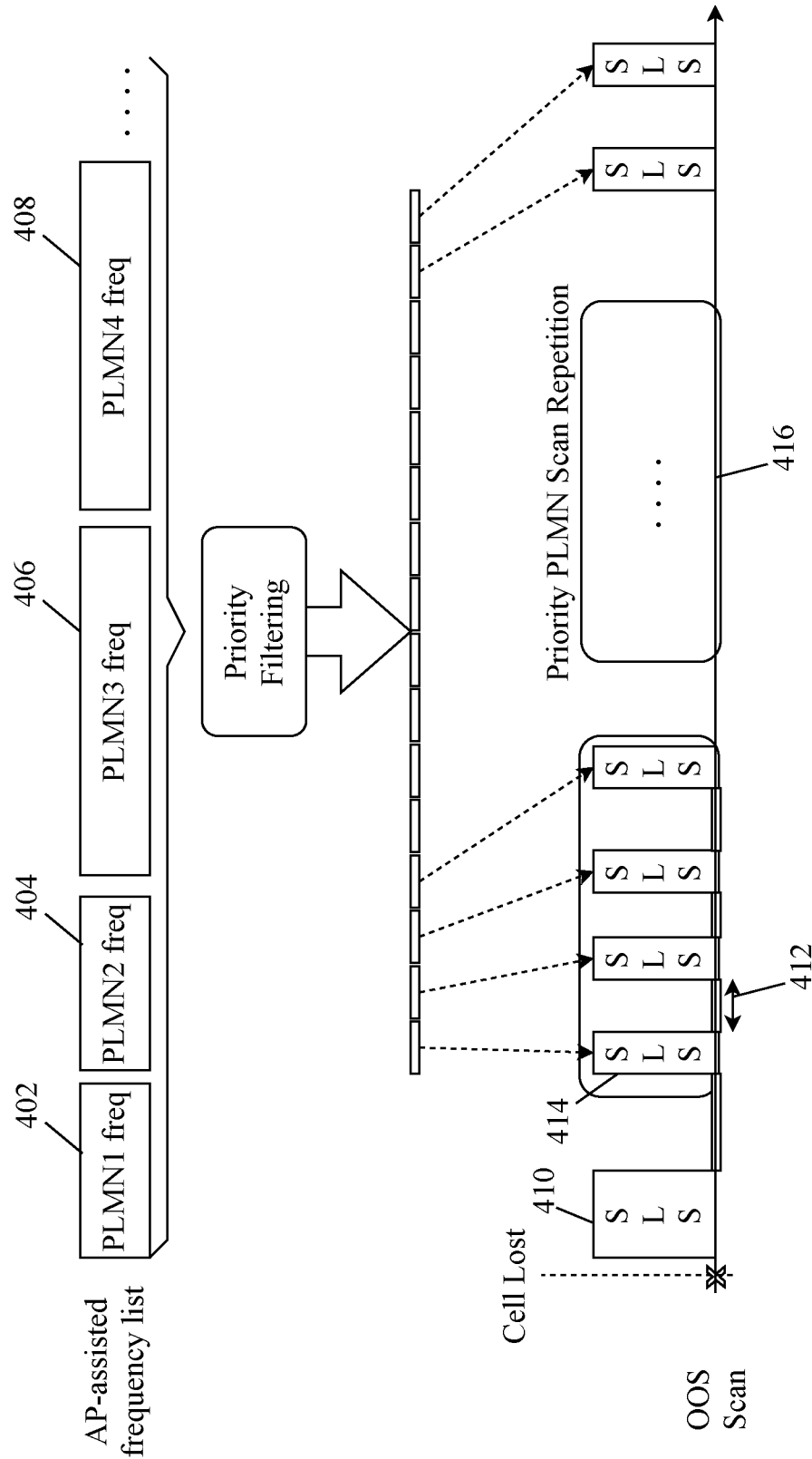
FIG. 4 shows a diagram illustrating a reduced power recovery scan performed by a UE according to various exemplary embodiments.

FIG. 4 shows a diagram illustrating a reduced power recovery scan performed by the UE 112 according to various exemplary embodiments. As described above, the operations described for FIG. 3 are related to situations where the UE 112 is initially powering up, e.g., the transceiver 225 is being turned on. However, there may also be situations where the UE 112 has already connected to a roaming network but then goes out of service (OOS) or into a limited service scenario. Typically, if this occurs, the UE will perform periodic scans (e.g., once every 5-10 seconds) to determine if the previously used frequency is available or if a cell is available as shown at 410. However, these scans are performed blindly. As shown in FIG. 4, according to various exemplary embodiments, the UE 112 may perform stored-list-scans (SLS) of the PLMNs and frequencies identified by the AP. The AP identifies these PLMNs and frequencies based on the current or last known location of the UE 112 (the location at which the UE 112 moved out of service). The UE 112 sorts the AP-identified PLMNs/frequencies based on the PLMN priority discussed above as shown in 402, 404, 406, and 408. The UE then performs the SLS scans 414 of the prioritized frequencies. In some embodiments, as indicated at 416, the UE 112 may repeat scans of frequencies at the top of the PLMN priority list and/or the frequency on which the UE 112 was previously camped before moving out of service since there is a higher chance that the UE 112 will successfully register on those PLMNs.

The aggregate RPPLMN may reduce the number of scans performed by the UE 112 while roaming, thus improving the battery life of the UE 112. For example, when a UE is rejected by a roaming network and there are multiple available networks, the UE will normally attempt to register on a network 5 times (e.g., every 10-15 seconds) per 3GPP standards. Each attempt will consume power. According to exemplary embodiments, instead of continuously attempting to connect to a roaming partner network, the UE 112 may modify the retry counter such that the UE 112 will increase the number of registration retries on higher priority PLMNs and eliminate retries on low priority PLMNs. In some embodiments, the UE 112 may additionally modify the time period between retries based on the signal strength (e.g., smaller period for strong signals, larger period for weak signals). If, during a registration attempt, the UE 112 receives a rejection #15 "no suitable cells in tracking area," the UE 112 may immediately switch to an alternative RAT (e.g., 3G, 2G) in the same PLMN since it is not likely that the UE will find an LTE network. However, if the UE 112 is also rejected on the alternative RAT, then the UE 112 may add the PLMN to a forbidden PLMN list.

In some embodiments, to further save power, the UE 112 may avoid consecutive or concurrent registration attempts on multiple networks. Instead, in some embodiments, the UE 112 may add a random backoff so that it does not expend a great deal of power in a small period of time. The UE 112 may enter a sleep mode during the random backoff and then attempt to connect to the next PLMN. Such a backoff timer is beneficial because it gives the UE time to possibly move away from an area where a roaming signal is weak and reconnection attempts would be futile and a waste of energy. In some embodiments, the UE 112 may alternatively interleave registration attempts on networks when a non-fatal rejection is received or in abnormal cases (e.g., continuous RACH failure). For example, if the UE 112 receives a rejection #17 network failure after attempting to register on top priority PLMN, the UE 112 may immediately attempt registration on the next PLMN. If registration on the second PLMN fails, the UE 112 may reattempt registration on the first PLMN.

As noted above, currently, a UE that is camped on a lower priority network will perform periodic scans for a higher priority network. However, accessory devices such as the UE 112 are typically not data-intensive devices and/or are not intended to display roaming carrier names. As such, PLMN priority is less critical. Therefore, according to some embodiments, the UE 112 may remain camped on a current PLMN regardless of the priority of the PLMN as long as the functionality of the UE 112 is supported. Additionally or alternatively, the periodic scans may be eliminated altogether if the cellular provider has only one roaming partner at a given location or has no preference as to which roaming partner is utilized. In some embodiments, with respect to countries bordering the UE's home country, home PLMN (HPLMN) searching may be limited to areas at the country border and eliminated at non-border areas.

In addition to the power-saving features discussed above, in some embodiments, the UE 112 may also disable its UMTS and or GSM chipset if those RATs are not supported for the UE 112. The UE 112 detects this scenario once the current MCC is detected and disables any chipsets that are not supported to conserve power.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations, comprising:
   prioritizing a plurality of Public Land Mobile Networks (PLMNs) from an aggregate roaming priority public land mobile network (RPPLMN) list containing the plurality of PLMNs into a plurality of prioritized PLMNs, wherein the aggregate RPPLMN list is composed by the UE based on information retrieved from a plurality of sources;
   selecting a PLMN from the plurality of prioritized PLMNs based at least on a priority of the selected PLMN, wherein the selecting further comprises:
      determining whether an application processor (AP) assisted location service is available, wherein the AP-assisted service is configured to identify a plurality of deployed PLMNs and a plurality of frequencies used by the plurality of deployed PLMNs at a current geographical location of the UE;

when the AP assisted location service is available, determining whether a registered PLMN (RPLMN) is valid in a current mobile country code (MCC);

when the AP-assisted location service is not available, determining whether a timestamp of an RPLMN is within a predetermined period of time; and connecting to the selected PLMN from the plurality of prioritized PLMNs.

2. The processor of claim 1, wherein when the RPLMN is not valid in the current MCC, the selected PLMN is one of the plurality of deployed PLMNs that has a higher priority than any other one of the plurality of deployed PLMNs.

3. The processor of claim 1, wherein when the RPLMN is valid in the current MCC, the selected PLMN is the RPLMN.

4. The processor of claim 1, wherein when the timestamp of the RPLMN is within the predetermined period of time, the selected PLMN is the RPLMN.

5. The processor of claim 1, wherein when the timestamp of the RPLMN is not within the predetermined period of time, the operations further comprise:

determining whether one or more operator-controlled PLMNs (OPLMNs) stored on a subscriber identity module (SIM) card of the UE are valid in the current geographical location of the UE.

6. The processor of claim 5, wherein, when the one or more OPLMNs are valid in the current geographical location of the UE, the selected PLMN is an OPLMN from the one or more OPLMNs on the SIM card that has a higher priority than any other OPLMN.

7. The processor of claim 5, wherein, when the one or more OPLMNs are not valid in the current geographical location of the UE, the operations further comprise:

attempting to connect to a home PLMN (HPLMN);

detecting all available PLMNs at the current geographical location of the UE, wherein the selected PLMN is one of the available PLMNs which has a higher priority than any other available PLMN.

8. The processor of claim 1, wherein, when a failure occurs while connecting to the selected PLMN, waiting for a backoff period of time before attempting to connect to the selected PLMN or a second selected PLMN from the plurality of prioritized PLMNs.

9. The UE of claim 1, wherein the plurality of sources comprises at least two or more of (i) an entitlement PLMN list comprising a list of global roaming partners that have a roaming agreement with a cellular provider of the UE, (ii) an operator-controlled public land mobile network (OPLMN) list stored on a subscriber identity module (SIM) card of the UE, (iii) a user-based PLMN list, (iv) the UE or (v) a companion UE.

10. A user equipment (UE), comprising:

a transceiver configured to communicate with a plurality of networks; and a processor communicatively coupled to the transceiver and configured to perform operations comprising:

prioritizing a plurality of Public Land Mobile Networks (PLMNs) from an aggregate roaming priority public land mobile network (RPPLMN) list containing the plurality of PLMNs into a plurality of prioritized PLMNs, wherein the aggregate RPPLMN list is composed by the UE based on information retrieved from a plurality of sources;

selecting a PLMN from the plurality of prioritized PLMNs based at least on a priority of the selected PLMN, wherein the selecting further comprises:

determining whether an application processor (AP) assisted location service is available, wherein the AP-assisted service is configured to identify a plurality of deployed PLMNs and a plurality of frequencies used by the plurality of deployed PLMNs at a current geographical location of the UE;

when the AP assisted location service is available, determining whether a registered PLMN (RPLMN) is valid in a current mobile country code (MCC);

when the AP-assisted location service is not available, determining whether a timestamp of an RPLMN is within a predetermined period of time; and connecting to the selected PLMN from the plurality of prioritized PLMNs.

11. The UE of claim 10, wherein when the RPLMN is not valid in the current MCC, the selected PLMN is one of the plurality of deployed PLMNs that has a higher priority than any other one of the plurality of deployed PLMNs.

12. The UE of claim 10, wherein when the RPLMN is valid in the current MCC, the selected PLMN is the RPLMN.

13. The UE of claim 10, wherein when the timestamp of the RPLMN is within the predetermined period of time, the selected PLMN is the RPLMN.

14. The UE of claim 10, wherein when the timestamp of the RPLMN is not within the predetermined period of time, the operations further comprise: determining whether one or more operator-controlled PLMNs (OPLMNs) stored on a subscriber identity module (SIM) card of the UE are valid in the current geographical location of the U E, wherein, when the one or more OPLMNs are valid in the current geographical location of the UE, the selected PLMN is an OPLMN from the one or more OPLMNs on the SIM card that has a higher priority than any other OPLMN.

15. The UE of claim 14, wherein, when the one or more OPLMNs are not valid in the current geographical location of the UE, the operations further comprise:

attempting to connect to a home PLMN (HPLMN); and detecting all available PLMNs at the current geographical location of the UE, wherein the selected PLMN is one of the available PLMNs which has a higher priority than any other available PLMN.

16. The UE of claim 10, wherein the UE is an accessory device that has a companion relationship with a companion UE.

* * * * *